United States Patent
Leibl

(10) Patent No.: US 9,139,227 B2
(45) Date of Patent: Sep. 22, 2015

(54) AXLE SUPPORT FOR A VEHICLE, IN PARTICULAR FOR A MOTOR VEHICLE, AND METHOD FOR THE PRODUCTION OF SUCH AN AXLE SUPPORT

(71) Applicant: AUDI AG, Ingolstadt (DE)

(72) Inventor: Peter Leibl, Manching (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/386,647

(22) PCT Filed: Mar. 4, 2013

(86) PCT No.: PCT/EP2013/000613
§ 371 (c)(1),
(2) Date: Sep. 19, 2014

(87) PCT Pub. No.: WO2013/139432
PCT Pub. Date: Sep. 26, 2013

(65) Prior Publication Data
US 2015/0034409 A1    Feb. 5, 2015

(30) Foreign Application Priority Data
Mar. 22, 2012  (DE) .......................... 10 2012 005 857

(51) Int. Cl.
*B62D 21/11*   (2006.01)
*B62D 29/00*   (2006.01)
*B62D 65/00*   (2006.01)

(52) U.S. Cl.
CPC .............. *B62D 21/11* (2013.01); *B62D 29/007* (2013.01); *B62D 65/00* (2013.01)

(58) Field of Classification Search
CPC ....... B62D 21/11; B62D 65/00; B62D 29/007
See application file for complete search history.

(56) References Cited

U.S. PATENT DOCUMENTS 4,232,881 A * 11/1980 Kolbel et al. .......... 280/124.128
5,839,776 A * 11/1998 Clausen et al. .......... 296/187.03
(Continued)

FOREIGN PATENT DOCUMENTS

DE     295 06 170       9/1995
DE   102004059008       6/2006
(Continued)

OTHER PUBLICATIONS

International Search Report issued by the European Patent Office in International Application PCT/EP2013/000613 on Jun. 17, 2013.

*Primary Examiner* — Paul N Dickson
*Assistant Examiner* — Darlene P Condra
(74) *Attorney, Agent, or Firm* — Henry M. Feiereisen LLC

(57) ABSTRACT

An axle support for a vehicle includes two longitudinal members and at least one cross member interconnecting the two longitudinal members. The at least one cross member is formed as a multi-part tailored blank component and is fixedly welded via its lateral cross member attachment zones arranged opposite in the longitudinal direction of the cross member to the respectively associated longitudinal member. The cross member is coated with a surface coating as a protective layer, in particular with a zinc layer. The lateral cross member attachment zones are each formed by an uncoated, in particular ungalvanized, single-part or multi-part sheet metal component, wherein the cross member midsection adjoining the two lateral cross member attachment zones is formed by a one-part or multi-part sheet metal component, which, when the axle support is installed, has at least one roadway-facing underside that is provided at least in some areas with the surface coating.

24 Claims, 3 Drawing Sheets

(56) References Cited

U.S. PATENT DOCUMENTS

| | | | |
|---|---|---|---|
| 6,149,198 A | 11/2000 | Klaas | |
| 7,837,230 B2* | 11/2010 | Mellis et al. | 280/781 |
| 2008/0265626 A1* | 10/2008 | Dorr et al. | 296/204 |
| 2011/0057407 A1* | 3/2011 | Noble | 280/124.1 |
| 2011/0068619 A1* | 3/2011 | Werner et al. | 301/127 |
| 2012/0313339 A1* | 12/2012 | Heimann et al. | 280/124.116 |
| 2013/0009390 A1* | 1/2013 | Charest et al. | 280/785 |
| 2013/0244014 A1* | 9/2013 | Gieseke et al. | 428/215 |
| 2013/0307242 A1* | 11/2013 | Noble et al. | 280/124.116 |

FOREIGN PATENT DOCUMENTS

| | | |
|---|---|---|
| DE | 102006017225 | 10/2007 |
| DE | 102007008641 | 8/2008 |
| DE | 102008020467 | 11/2008 |
| DE | 102007030929 A1 | 1/2009 |
| DE | 102008027491 | 12/2009 |
| DE | 102007030929 B9 | 5/2010 |
| DE | 100 57 566 | 6/2010 |
| DE | 102009030776 | 12/2010 |
| DE | 102011106557 | 1/2012 |

* cited by examiner

US 9,139,227 B2

AXLE SUPPORT FOR A VEHICLE, IN PARTICULAR FOR A MOTOR VEHICLE, AND METHOD FOR THE PRODUCTION OF SUCH AN AXLE SUPPORT

CROSS-REFERENCES TO RELATED APPLICATIONS

This application is the U.S. National Stage of International Application No. PCT/EP2013/000613, filed Mar. 4, 2013, which designated the United States and has been published as International Publication No. WO 2013/139432 and which claims the priority of German Patent Application, Serial No. 10 2012 005 857.8, filed Mar. 22, 2012, pursuant to 35 U.S.C. 119(a)-(d).

BACKGROUND OF THE INVENTION

The invention relates to an axle support for a vehicle, in particular for a motor vehicle, and to a method for the production of an axle support for a vehicle, in particular for a motor vehicle.

Such axle supports, also referred to as subframe or chassis underframe, are generally known and are typically comprised of two longitudinal members which are oriented substantially in vehicle length direction, when the axle support is installed, and which are connected to one another by at least one cross member oriented substantially in vehicle transverse direction. Surface protection for axle supports of steel material is usually realized by cathodic electro-deposition. When regions of the axle support, such as especially a leading cross member of the axle support, as viewed in travel direction, lie in the jet stream of particles that have been hurled up by the vehicle tires, particular surface protection measures are taken in order to protect this axle support region from damage. It is hereby generally known to attach for example protective plastic shells on the axle support. Furthermore, a very expensive complete galvanization of the axle support is generally known. Individually galvanized parts are, however, not welded, because the complex geometries of the formed components do not enable zinc fumes generated during welding to escape and cause gas pockets in the weld seams. Such gas pockets form pores in weld seams which in turn result in excessive variations of the service life of the weld seams and thus are unsuitable for use in safety components, as axle supports are considered.

An axle support for motor vehicles is already known from the generic DE 10 2007 030 929 B9 and includes two longitudinal members and two cross members connecting the two longitudinal members with one another, wherein both cross members as well as the longitudinal members can be made from sheet metal shells welded to one another. In particular the leading cross member, as viewed in travel direction, should be formed from a leading and a trailing sheet metal shell, wherein a leading sheet metal shell is formed by at least three metal sheets, welded to one another, such that the leading sheet metal shell has two outer sections which are connected to the longitudinal members, with the outer sections being interconnected by a middle section having a smaller sheet metal thickness or is made of material with less strength than the outer sheet metal parts. This leading sheet metal shell is thus manufactured as tailored blank sheet metal component to provide a cross member with optimal weight and material properties. The same applies analogously also for the region of the longitudinal members and the region of the second cross member. In all such cross members and longitudinal members, made in shell construction, pre-coated metal sheets may further be used, i.e. metal sheets which are surface-coated with a zinc alloy or aluminum alloy. This results, however, in the afore-mentioned drawbacks, namely gas pockets and thus pore formation in the weld seams, when such galvanized individual parts are welded. This may cause a reduction in service life of the weld seams.

The use of a tailored blank sheet metal components, as described above in connection with the DE 10 2007 030 929 B9, is generally known. This involves the use of several planar sheet metal blanks or sheet metal plates which are welded to one another and tailored to suit the respective technical application. The individual sheet metal blanks have different sheet metal thicknesses and/or are made of materials with different strengths. The desired formed components are then manufactured from these planar tailored blank sheet metal plates through forming. The individual sheet metal blanks of the tailored blank component are hereby arranged in relation to one another such that the shaped formed component has in precisely predefined regions the respective sheet metal blank that has the desired wall thickness or material strength for this region. Thus, component regions that are less exposed to stress are for example formed by sheet metal blanks of lesser sheet metal thickness than those component regions that are exposed to greater stress. In this way, components are produced of dimensions and constructions suited to stress and having optimum overall weight, as this is the case in DE 10 2007 030 929 B9.

There are different tailored blank types or methods, such as for example TRB (Tailored Rolled Blank), in which the sheet metal strip (coil) is rolled cold yet again to produce different metal sheet thicknesses. In contrast thereto, the tailored welded blank process (TWB process) involves a welding of the individual metal sheet blanks to one another. This is normally realized in butt joint configuration by laser welding.

SUMMARY OF THE INVENTION

Against this background, it is an object of the present invention to provide an axle support for a vehicle, in particular a motor vehicle, exhibiting high surface protection and providing a high-quality attachment of the at least one cross member to the longitudinal member. Furthermore, it is an object of the present invention to provide a method for the production of such an axle support in which the attachment of the at least one cross member to the longitudinal members is of high quality.

This object is attained by the features of the independent patent claims. Advantageous configurations are subject matter of the subclaims dependent therefrom.

According to one aspect of the invention, an axle support for a vehicle, in particular for a motor vehicle, is proposed, having two longitudinal members and at least one cross member connecting the two longitudinal members to one another. This at least one cross member is preferably substantially oriented in vehicle transverse direction, wherein the at least one cross member or at least one of the cross members is designed as multi-part tailored blank component and has lateral cross member attachment zones, opposing one another in cross member length direction, for firm securement to the respectively associated longitudinal member by at least one weld joint. Moreover, the cross member has some areas provided with a surface coating as a protective layer, in particular with a zinc layer. According to the invention, the lateral cross member attachment zones are each formed by an uncoated, particularly ungalvanized, single part or multi-part sheet metal component, wherein the cross member midsection, adjoining the lateral cross member attachment zones, is formed by a single part or multi-part sheet metal component which has at least one underside facing the roadway, when the axle support is installed, and provided at least in some areas with the surface coating, for example with a zinc layer.

The terminology "uncoated" is to be understood here as relating to a cross member that does not have in this region a coating with a material that during the welding process has a tendency to form gases or fumes which are trapped in the region of the weld seam and could cause gas pockets or pores there. Specifically, these regions then do not have any metallic and/or chemical or galvanically applied surface coating, i.e. for example no zinc layer or zinc alloy layer or no light metal alloy layer, such as for example an aluminum alloy layer.

Accordingly, the surface coating provided in midsection of the cross member and forming in particular a protective layer against swirling particles, like for example pebbles, dirt or the like, represent within the scope of the present inventive idea preferably a chemically and/or galvanically applied surface coating which, when applied, realizes a firm connection with the surface to be coated. In particular, the coating material is liquid or gaseous or also powdery prior to coating and is applied also in this state onto the workpiece surface to be coated, so that for example by drying or making a chemical connection with the surface of the material to be coated, the desired surface coatings are formed as protective layers only on the component itself. For example, the application of such surface coatings may be realized by immersion baths, by electrolytes but also by spraying or dusting the surfaces. The thus applied surface coatings involve advantageously also metallic protective layers.

Such a solution according to the invention thus is able to provide on one hand the desired surface protection against particles hurled up by vehicle tires for example, without the need for attaching expensive protective plastic shells on the axle support and without requiring for this a complete and very expensive galvanization of the entire part. Furthermore, the uncoated or ungalvanized side regions of the cross member can be welded by the solution according to the invention to the respectively associated longitudinal member in a simple manner and in the absence of the afore-mentioned problem of gas pockets and pore formation as a result of zinc fumes, thus resulting in a long service life of the weld seams and thus in a high-quality attachment of the cross member to the longitudinal members.

As the connection of this uncoated or ungalvanized side regions of the cross member with the at least one surface-coated or galvanized midsection of the cross member is realized by welding, as typical in tailored blank sheet metal components, the planar sheet metal plates or sheet metal blanks are welded with one another during production of the planar component supplied to the forming device. This welding of the planar sheet metal plates or sheet metal blanks enables very good escape of fumes produced during welding of the surface-coated or galvanized sheet metal component so as to prevent gas from being trapped and the formation of pores in the weld seams. Thus, according to a particularly preferred specific configuration, the two lateral cross member attachment zones are each a part of an uncoated, especially ungalvanized and/or shaped sheet metal component which is firmly welded with a sheet metal component which defines the midsection and has at least some areas that are coated, especially galvanized and/or shaped.

To realize cross member configurations that are lightweight, cost-optimized and suited to need and stress, provision may be made for the individual, interconnectable sheet metal plates or sheet metal blanks to have at least in part a different material strength and/or a different material strength.

To provide an overall superior surface protection, the at least one sheet metal component forming the midsection of the cross member is surface-coated in its entirety, especially entirely galvanized.

According to a further particularly preferred specific embodiment, the axle support has several, especially two, cross members which interconnect the two longitudinal members that are oriented substantially in vehicle length direction, when the axle support is installed, wherein only the leading cross member, as viewed in travel direction, is provided with a surface coating. In such a construction, only the especially critical region of the axle support that is also exposed to stress is surface-coated, so that the surface coating and galvanization can be applied at overall reduced costs.

Especially preferred is further a configuration in which the longitudinal members are made of an uncoated, especially ungalvanized, material in a region of the longitudinal member that is associated to the cross member attachment zone. This ensures that the entire attachment zone of longitudinal member and cross member can be kept free of any gas pockets caused by fumes, like for example zinc fumes, so that the quality of the weld seams is even further improved.

According to an especially concrete configuration for that purpose, provision may be made to produce at least one of the longitudinal members, preferably both longitudinal members, in one part or multiple parts and/or from a sheet metal material.

Especially preferred is the formation of the at least one longitudinal member as tailored blank component by several shaped and interconnected, especially welded, sheet metal components which preferably have at least in part a different wall thickness and/or material strength.

The surface coating, in turn, is preferably formed metallic, for example by an aluminum alloy. Especially preferred is the formation of the protective layer by a zinc layer however, which again can be formed by a pure zinc layer or by a zinc alloy layer.

At this point, it should again be expressly noted that the lateral cross member attachment zones frequently have a geometry that deviates from a planar shape, for example formed respectively from a malleable portion which in relation to a cross member plane or plate plane has been bent and/or angled and/or collared and/or is formed by a hollow profile and/or formed by an undercut geometry. The risk of pockets of zinc fumes as pores in weld seams is particularly relatively great in such shaped and non-planar cross member attachment zones, when using galvanized cross member attachment zones. This risk can be avoided in the afore-described manner by the solution according to the invention, in which the two lateral cross member attachment zones do not have a surface coating or zing coating, especially when such complex geometries or shapes are involved that deviate from the planar plate geometry.

According to another aspect of the invention, a method for the production of an axle support for a vehicle, especially for a motor vehicle, is proposed in which the two lateral cross member attachment zones of the at least one cross member or of at least one of the cross members are formed by an uncoated, especially ungalvanized, planar sheet metal plate or sheet metal blank, which, prior to forming of the cross member into the final shape, is connected, especially welded, with a planar sheet metal plate which has the surface coating, especially zinc layer, and forms the midsection. As a result, the forming device can be supplied with a planar malleable sheet metal blank as pre-material and as component composite of several planar sheet metal plates with uncoated, especially ungalvanized, side regions and a midsection which at least in some areas is surface-coated, especially galvanized. The planar malleable sheet metal blank is then formed into the final shape in the forming device, in particular a deep-drawing device and/or pressing device, in one step or multiple steps. Subsequently, the thus-produced cross member is welded with its cross member attachment zones formed by the uncoated, especially ungalvanized side regions, to the respectively associated longitudinal members.

With such a method, the advantages previously mentioned in connection with the axle support are realized.

BRIEF DESCRIPTION OF THE DRAWING

The invention will be explained hereinafter in greater detail with reference to a drawing.

it is shown in.

DETAILED DESCRIPTION OF PREFERRED EMBODIMENTS

Figure 1:
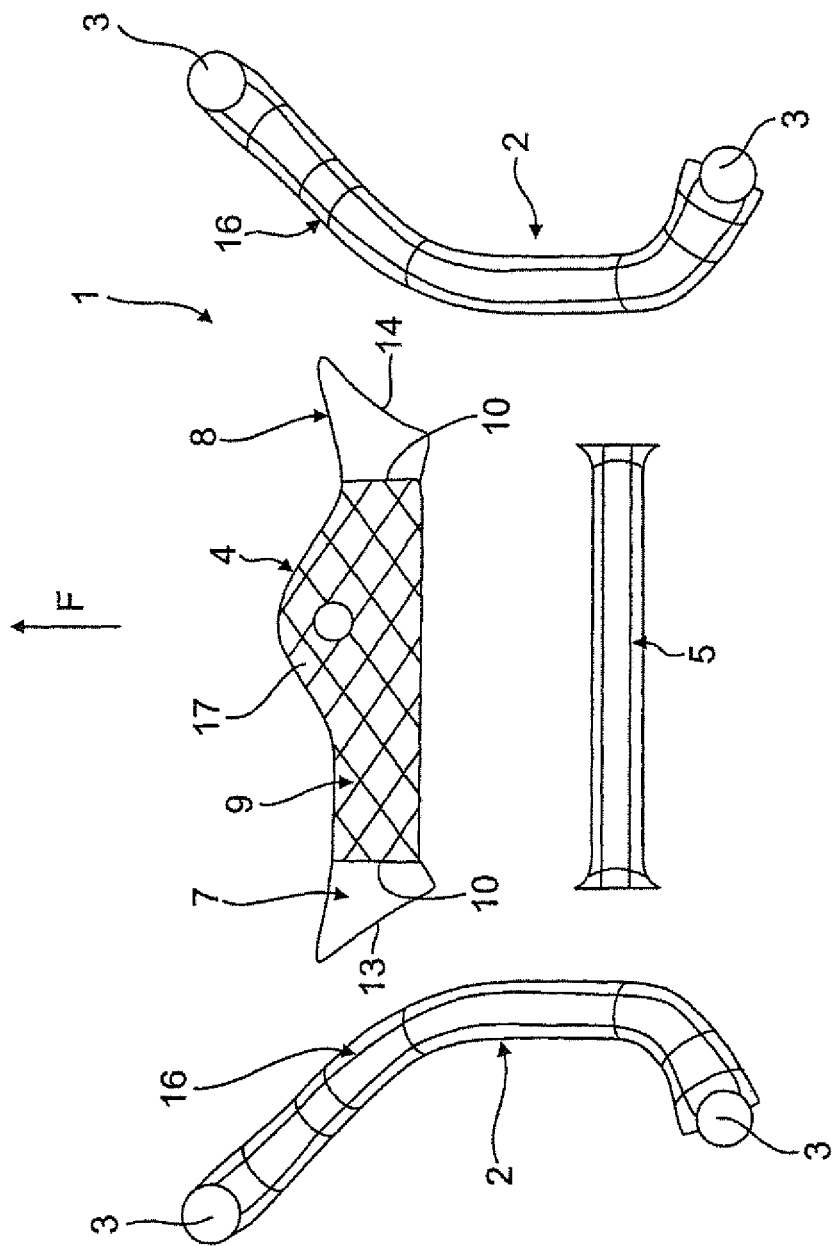
FIG. 1 the components of an exemplary embodiment of an axle support according to the invention in a not yet joined-together state.
Figure 2:
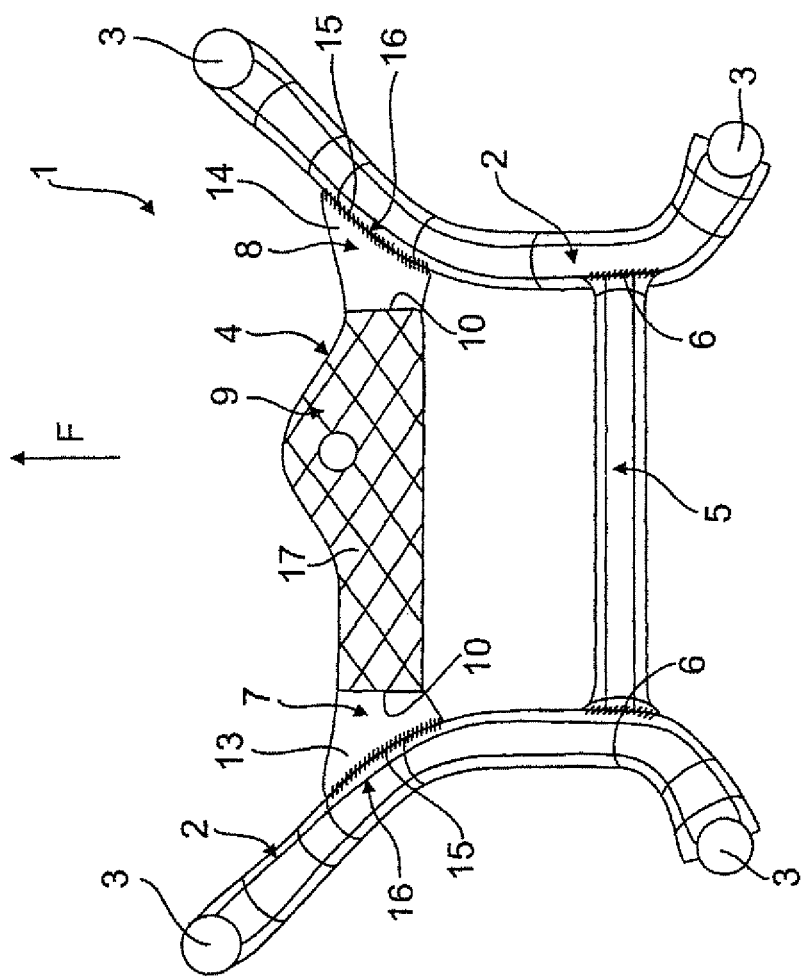
FIG. 2 the components of the axle support of FIG. 1 in the connected state.

FIGS. 1 and 2 show an exemplary embodiment of an axle support 1 according to the invention for a not further shown vehicle, in particular a motor vehicle, such as a passenger car. This axle support has two longitudinal members 2 which are substantially oriented in travel direction F and have ends which are disposed in opposite relationship in travel direction F and have attachment sites 3, to which the axle support is connected, for example via rubber-metal bearings, to the body. This is, however, not shown here in detail.

The two longitudinal members 2 can be made for example of an ungalvanized steel material, for example be formed by non-galvanized tailored blank sheet metal components. This is, however, also not shown here any further. As an alternative, the longitudinal members 2 can also be produced in one piece from a steel material, for example formed by castings.

The two longitudinal members 2 are connected transversely to the travel direction F and thus, as viewed in vehicle transverse direction, by two cross members 4, 5 which are spaced apart in travel direction F. This can be seen in particular from FIG. 2 which shows the finally assembled state of the axle support 1. Specifically, the trailing cross member, as viewed in the travel direction F, is made, for example, by a malleable sheet metal component of an ungalvanized sheet metal material, which is firmly connected in the region of its ends to the respectively associated longitudinal member 2 by weld seams 6.

Figure 3:
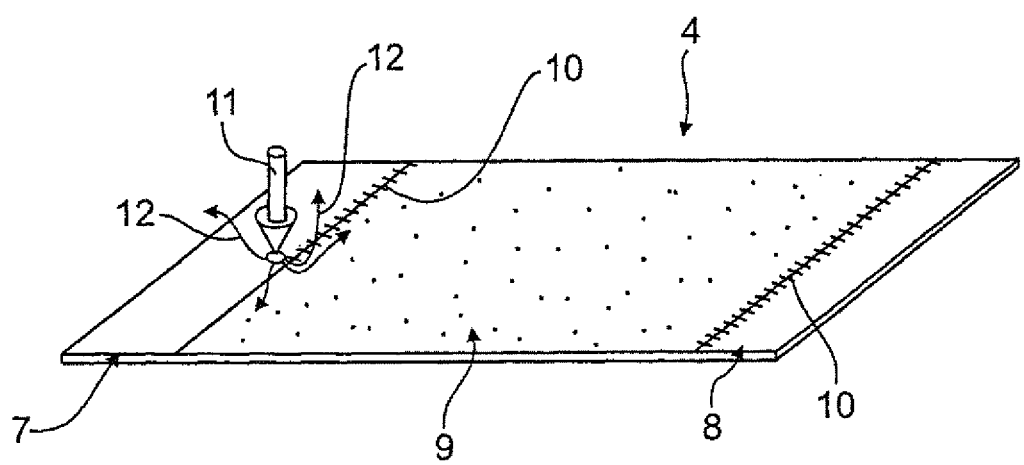
FIG. 3 schematically and in perspective, the connection of two lateral, ungalvanized sheet metal blanks/sheet metal plates with a galvanized, central and planar sheet metal plate/sheet metal blank, in which galvanization fumes, caused during welding, are able to escape unimpeded and do not form gas pockets.

The leading cross member 4, as viewed in travel direction F, has here a particular configuration which will be explained in greater detail hereinafter also with reference to FIG. 3:

The cross member 4 is formed from a tailored welded blank sheet metal component which in the initial state, as shown in FIG. 3, has two lateral ungalvanized planar sheet metal plates 7, 8 which are connected by a middle, planar sheet metal plate 9 via weld seams 10. The middle sheet metal plate 9 is formed by a galvanized sheet metal plate having an outer side or surface which is coated with a zinc layer, for example a pure zinc layer or zinc alloy layer.

As is can be seen only schematically in FIG. 3, zinc fumes 12, produced during evaporation of the zinc coating, when the weld seams 10 are made between the lateral ungalvanized sheet metal plates 7, 8 and the galvanized middle sheet metal plate 9 by a welding device 11, shown only greatly schematically—are able to effectively escape into the environment as a result of the planar arrangement of the sheet metal plates 7, 8, 9, so as to prevent any gas pockets in the weld seams 10 and to be able to produce weld seams 10 of superior weld seam quality.

Apart from the difference in the coating or galvanization, the individual sheet metal plates 7, 8, 9 can also be configured with different wall thicknesses or material thicknesses and/or with different material properties, especially material strengths. This, however, is not shown here.

In the exemplary embodiment shown here, the middle sheet metal plate 9 is preferably completely galvanized. Basically, the sheet metal plate 9 may also be galvanized only on one side, or at least in one or more portions, depending on the surface protection requirements of the construction task to be solved respectively.

The just described planar component composite of the three sheet metal plates 7, 8, 9 is then fed to a not shown forming device, for example a deep-drawing device and/or a pressing device, in which this component composite is shaped into the geometry of the cross member 4, as shown schematically by the plan view in FIG. 1, in particular is provided in the area of the cross members attachment zones 13, 14 with bends, undercuts, cavities and the like. This, however, is not shown here for ease of illustration.

As can be further seen from FIG. 1, the ungalvanized sheet metal plates 7, 8 now form ungalvanized lateral cross member attachment zones 13, 14, which, as shown in FIG. 2, are connected firmly via one or more weld seams 15 to the also ungalvanized longitudinal member connection zones 16 of the longitudinal member 2.

Because these lateral cross member attachment zones 13, 14 are formed by shaped, ungalvanized sheet metal plates 7, 8, the weld seams 15 can be produced of very high weld seam quality since the absence of the zinc coating of this cross member region prevents any pockets of zinc fumes and thus the formation of undesired pores.

At this point, it again should be expressly mentioned that the lateral cross member attachment zones 13, 14 in the state illustrated in FIGS. 1 and 2 have a complex geometry which deviates from a planar plate geometry and is formed by bending and/or undercuts or the like with geometries that deviate from a planar plate geometry, which complex geometries that differ from the planar plate geometry normally result in a gas pocket in the weld seams, when galvanized cross member attachment zones are involved, since due to the complex geometries the resultant zinc fumes are unable to escape into the environment or cannot escape rapidly enough into the environment.

Furthermore, the midsection of the cross member 4, shown in FIGS. 1 and 2 by a cross-hatching and formed by the galvanized middle sheet metal plate 9, i.e. provided with a zinc coating 17, provides a sufficient surface protection against particles, like for example pebbles or the like, which are hurled up from the roadway.

What is claimed is:

1. An axle support for a vehicle, comprising:
   two longitudinal members;

at least one cross member connecting the two longitudinal members to one another, said at least one cross member or at least one of a plurality of cross members being configured as multi-part tailored blank component having lateral cross member attachment zones, which oppose one another in a cross member length direction for firm securement to the longitudinal members by a weld joint and are each formed by an uncoated single part or multi-part sheet metal component, and a cross member midsection, which adjoins the lateral cross member attachment zones and is formed by a single part or multi-part sheet metal component; and a surface coating applied on at least one area of at least one roadway-facing underside of the cross member midsection to provide a protective layer.

2. The axle support of claim 1, wherein the surface coating is a zinc layer.

3. The axle support of claim 1, wherein the sheet metal component of each of the lateral cross member attachment zones is ungalvanized.

4. The axle support of claim 1, wherein the two lateral cross member attachment zones are each part of an uncoated sheet metal component and are each firmly connected with the cross member midsection.

5. The axle support of claim 1, wherein the sheet metal component for the cross member midsection is galvanized.

6. The axle support of claim 1, wherein the two lateral cross member attachment zones are welded to the cross member midsection.

7. The axle support of claim 1, wherein the sheet metal components for the lateral cross member attachment zones and the sheet metal component for the cross member midsection are formed by sheet metal plates which together as component composite are formed into a final cross member geometry.

8. The axle support of claim 7, wherein the sheet metal plates for the lateral cross member attachment zones and the cross member midsection are formed into the final cross member geometry by deep drawing and/or pressing.

9. The axle support of claim 7, wherein the sheet metal plates for the lateral cross member attachment zones and the sheet metal component for the cross member midsection have at least in part a different material thickness and/or different material strength.

10. The axle support of claim 1, wherein the surface coating is applied across an entire surface area of the sheet metal component for the cross member midsection.

11. The axle support of claim 1, further comprising a plurality of said cross member configured to interconnect the two longitudinal members which are oriented in a vehicle longitudinal direction when the axle support is installed, with the surface coating being applied only upon a leading one of the cross members, as viewed in a travel direction.

12. The axle support of claim 1, wherein the longitudinal members have each a longitudinal member, respectively associated to the two lateral cross member attachment zones and made of an uncoated, weldable material.

13. The axle support of claim 12, wherein the longitudinal member region is ungalvanized.

14. The axle support of claim 1, wherein at least one of the longitudinal members is made in one or multiple parts and/or made of a sheet metal material.

15. The axle support of claim 1, wherein at least one of the longitudinal members is made as a tailored blank component which is formed of several shaped and interconnected sheet metal components which have at least in part a different material thickness and/or material strength.

16. The axle support of claim 1, wherein the surface coating is a coating selected from the group consisting of metallic surface coating and a surface coating which is applied chemically and/or galvanically.

17. The axle support of claim 1, wherein the surface coating is a pure zinc layer or a zinc alloy layer or a light metal alloy layer.

18. The axle support of claim 17, wherein the light metal alloy layer is an aluminum alloy layer.

19. The axle support of claim 1, wherein at least one of the lateral cross member attachment zones has a shape which deviates from a planar geometry.

20. The axle support of claim 19, wherein the at least one of the lateral cross member attachment zones is formed from a malleable portion which in relation to a cross member plane or a sheet metal component plane has been bent and/or angled and/or collared and/or is formed by a hollow profile and/or formed by an undercut geometry.

21. A method for the production of an axle support for a vehicle, comprising:

forming a lateral cross member attachment zone of a cross member or of at least one of a plurality of cross members from a first uncoated planar sheet metal plate;

applying a surface coating on at least one area of a second planar sheet metal plate;

connecting the lateral cross member attachment zone with the second sheet metal plate to form a planar malleable sheet metal blank having an uncoated side region formed by the first uncoated planar sheet metal plate and a midsection formed by the second planar sheet metal plate;

transferring the planar malleable sheet metal blank as prematerial and as component composite of several planar sheet metal plates to a forming device;

forming the planar malleable sheet metal blank into the final shape in the forming device in one or multiple steps to produce a cross member; and welding the cross member via the cross member attachment zone to a longitudinal member.

22. The method of claim 21, wherein the first sheet metal plate is ungalvanized.

23. The method of claim 21, wherein the cross member is formed into a final shape by a deep drawing and/or pressing process.

24. The method of claim 21, wherein the lateral cross member attachment zone is welded to the second sheet metal plate.

* * * * *